United States Patent [19]

Marchal

[11] Patent Number: 4,832,747

[45] Date of Patent: May 23, 1989

[54] BITUMEN EMULSIONS

[75] Inventor: Jean Marchal, Houppeville, France

[73] Assignee: Exxon Chemical Patents Inc., Linden, N.J.

[21] Appl. No.: 168,218

[22] Filed: Mar. 15, 1988

[30] Foreign Application Priority Data

Mar. 16, 1987 [GB] United Kingdom ............... 8706148

[51] Int. Cl.$^4$ .................. C08L 95/00; C09D 3/24
[52] U.S. Cl. .................. 106/277; 252/311.5
[58] Field of Search .................. 106/277; 252/311.5

[56] References Cited

U.S. PATENT DOCUMENTS

| | | | |
|---|---|---|---|
| 4,056,401 | 11/1977 | De Bough | 106/277 |
| 4,154,619 | 5/1979 | Pronk | 106/277 |
| 4,339,277 | 7/1982 | Schult | 106/275 |
| 4,496,474 | 1/1985 | Reck | 106/277 |
| 4,629,511 | 12/1986 | Vanderzanden | 106/277 |

FOREIGN PATENT DOCUMENTS 0162591 11/1985 European Pat. Off. .

Primary Examiner—Paul Lieberman
Assistant Examiner—Helene Kirschner
Attorney, Agent, or Firm—J. F. Hunt

[57] ABSTRACT

Bitumen emulsions, usually having a relatively low average particle size, can be continuously and speedily prepared by a process comprising feeding emulsion components into the first of at least two static mixers, arranged in series. The product is passed from the first mixer to the second mixer maintained at a temperature lower than that prevailing in the first mixer and below the boiling point of water. The final emulsion product is obtained from the outlet of the second mixer. Bitumen emulsions of up to 70 wt. % bitumen of mean particle size of from 2 to 8 microns are also described.

8 Claims, 1 Drawing Sheet

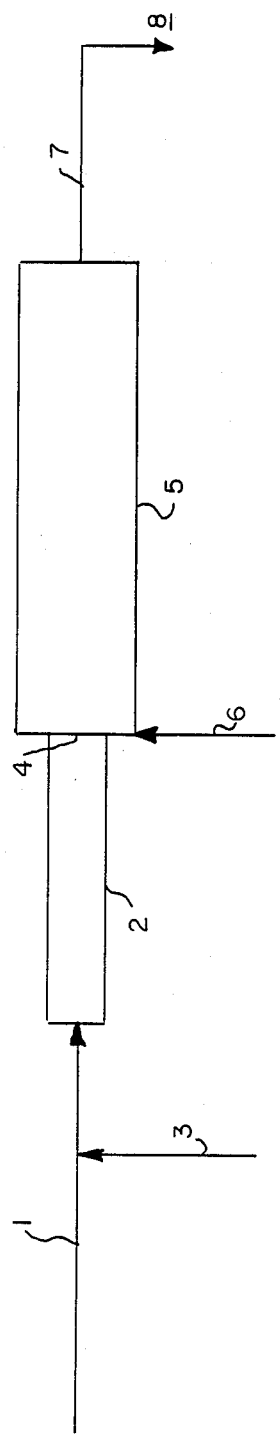

BITUMEN EMULSIONS

This invention relates to bitumen emulsions and a process for preparing them. Bitumen emulsions are well known materials useful in road-making and for other purposes. Their attractions are ease of handling, because of their lower viscosities than the starting bitumen, and their ability to be applied at lower temperatures in spraying etc techniques. There are no environmental problems because in use when the emulsion breaks and the water present evaporates to leave a film of bitumen where required.

There are two main methods currently used in the preparation of bitumen emulsions. The first employs a colloid mill and the second a centrifugal pump.

In the process employing a colloid mill, bitumen, water and emulsifier are emulsified at a high shear rate. The process is continuous, but to obtain an emulsion in which the mean diameter particle size of the bitumen is at an acceptable level, then for any given pump there is a limit on throughput in order that a sufficiently high shear rate is obtained. Furthermore, the process is conducted at atmospheric pressure and in order for the emulsion product to emerge at a temperature of less than 100° C. then it is found in practice that bitumen cannot be fed into the emulsifier at more than 140° C. Higher temperatures for the bitumen feed require lower temperatures for the water feed. This causes skin-hardening of the bitumen on contact of the two feeds and emulsification becomes very difficult. This temperature factor places a limitation on the types of bitumen which may be employed in bitumen emulsion manufacture by this route. A recent development, employing pressures slightly greater than atmospheric, involves cooling the product so that it can emerge from the mixer at below 100° C. This entails extra equipment and is difficult to control.

The second known method employs a centrifugal pump which, in practice, cannot normally be operated under pressure. Again, this process has the drawbacks of the above-referred to colloid mill process and, furthermore, is essentially only a batch process. The water phase has to be continually recycled whilst the hot bitumen is added little by little. The resultant emulsion product has a fairly wide particle size distribution and this leads to unevenness in the surface obtainable in use of the product.

In EP 0 162 591 there is described a bitumen emulsion composition and preparation of a high internal phase ratio emulsion of bitumen in water which is produced under low shear conditions. The process of manufacture comprises an emulsion in which distorted bitumen droplets have mean diameters in the range 2 to 50 microns separated by thin filaments of water; such emulsions containing 70 to 98 percent, more particularly, 80 to 98 percent by weight of bitumen. Reference is made to a process using equipment well-known to be suitable for mixing viscous fluids. In addition to the equipment specifically referenced, there is a statement that static mixers may also be used.

There is a definite need of a continuous bitumen emulsification process which is readily controllable, capable of a good output rate of a product having bitumen particles of low mean average particle size, and can employ a wide range of bitumen starting materials.

In the description and claims which follow, the term bitumen is employed to mean natural or petroleum-derived bitumens and includes the well-known penetration grade bitumens, blown or oxidised grades and polymer-modified bitumens, for example, modified with styrene-butadiene polymers or ethylene vinyl acetate polymers.

Examples are, those having a softening point (Ring and Ball) from 20, preferably from 50° to 200° C. Particularly suitable are those whose softening point is between 35 and 100, especially 35° to 60° C. or 43° and 60° C.; and/or whose ASTM penetration index at 25° C. is from about 40 to about 70.

According to the present invention there is provided a process for a process for the preparation of a bitumen emulsion comprising:

(a) feeding the bitumen into a first static mixer at a temperature above 50° C.;

(b) introducing water under pressure into the first static mixer, the pressure being sufficient to prevent substantial vaporization of the water;

(c) introducing a surfactant or emulsifier into the first static mixer;

(d) mixing the bitumen, water and surfactant or emulsifier in the first static mixer;

(e) passing the resultant mixture from the first static mixer to a second static mixer in which the temperature is lower than that prevailing in the first static mixer and below the boiling point of water;

(f) passing the mixture through the second static mixer; and (g) removing a bitumen emulsion product from the second static mixer without substantial loss of water.

Static mixers are well known, for example, those known as Fulzer or Kenics. Kenics mixers are described in Chemineers Brochure 800E published in 1984 by Chemineer Ltd. U.S. Pat. No. 3,286,992 discloses such mixers.

Suitable first and second static mixers for use in the process of the present invention are generally not the same size (length, diameter, number of internal elements); and they are mixers where the contact of the materials to be mixed and the mixing is very high leading to a high shear rate. They are characterised by a short residence time which enables a high throughput to be achieved and hence makes them particularly suitable for continuous production processes. Because of the specific design of the mixer there is successive division of the turbulent flow and this leads to dispersion of the materials as they pass through the mixer. A high flow rate is possible, the flow rate being a function of the static mixer diameter length and pump characteristics. Great flexibility is possible using static mixers where their length and the temperature and pressure can be adjusted to provide the desired emulsion. The number of mixers or of elements in the or each mixer used in the process of the invention is not limited and a combination of several types might be selected in order to adjust mixing efficiency and emulsion drop size. There may, for example, be two or more mixers forming the first stage and two or more forming the second stage.

In a preferred practice of the invention the outlet of the first static mixer is located close to the inlet of the second static mixer. It is therefore convenient for the mixers to be arranged concentrically and for the tubular diameter of the second static mixer to be slightly greater than that of the first static mixer and the outlet of the first static mixer extends into the second static mixer. In this manner the outlet of the first static mixer and the inlet of the second static mixer are coincident. Also possible is the division of flux in several static mixers installed in parallel.

In accordance with the invention the bitumen is introduced into the first static mixer. Water is also introduced into the first static mixer and also at least some of the required surfactant (emulsifier). Normally the surfactant is added as an aqueous solution, preferably in the water feed to the static mixer. The amount of water introduced into the first static mixer must be at least a sufficient volume (of the total volume required for the final product) to facilitate emulsification in the static mixer. The introduction, e.g. injection of water into the first static mixer must be under pressure. This pressure must be sufficient to prevent substantial vaporisation of the water in the static mixer and in practice the pressure is usually between 2 and 100 bars, preferably between 2 and 80 bars, and more preferably 2 to 50 bars, for example, 10 to 30. The differential pressure observed into the mixers is dependent upon their design (diameter, length, number of elements) and the flow rate inside the equipment. The feeding pump characteristics are the only limiting factors. The temperature in the first static mixer is usually 70° C. to 250° C., more preferably between 110° and 190° C., for example, 110° to 150° C. or 110° C. and 130° C. Bitumen is normally fed at 100° to 200° C.

On emerging from the first static mixer the product is fed into a second static mixer. Preferably this latter will be of greater diameter and contain more static mixing elements. Further water and/or surfactant may also be introduced into this second mixer, preferably at the inlet end thereof. The preferred purpose of the second mixer is to effect good dispersion, to reduce the temperature to less than 100° C. and to provide a pressure drop so that the product emerges at substantially atmospheric pressure.

Thus, if a portion of the overall required amount of water for any given emulsion is held back from the first mixer and fed into the second, it will act as a quench and assist the required temperature reduction.

The surfactant/emulsifier used may be any of those conventionally used in making bitumen emulsions. Whilst not usual, it is possible to employ a non-ionic type. Typical anionic surfactants are sodium oleate and sodium abietate. More usually cationic emulsions are required and the known cationic surfactants, for example, hydrochlorides of amines, are very suitable. One such is tallow diamine hydrochloride sold under the Trade Name Dinoram S.

Compared with previous bitumen emulsion manufacturing processes one can often obtain a higher total flow rate at a significantly reduced cost. The process of this invention is a cheap continuous process since it allows flow rates of 5 to 50 m/s and a high production rate, up to 20 m³ per hr in pilot facilities as well as a great flexibility in process equipment selection (several mixers in series, variable size and number of internals, various injection points, surfactant blends, temperature gradient). Moreover, establishing the optimum emulsion operating conditions is extremely easy, to steady state in the equipment being reached after a few seconds. It allows recycling operations (finished emulsion recycled at the inlet of the first static mixer) for improving the particle size distribution and emulsion stability.

In accordance with another aspect of the invention there is provided a bitumen emulsion comprising up to 70 wt %, for example, from 50 up to 70 wt%, of bitumen having a mean particle diameter in the range of 2 to 8 microns, more especially in the range 2 to 6.5 or 7 microns; but 0.5 to 8 microns is also within the invention.

More preferably the emulsion comprises from 50 to 70 wt%, for example, 55 to 65 wt %, of bitumen having a mean particle diameter in the range 2 to 6.5 microns.

A diagrammatic illustration of an arrangement suitable for use in the process of the invention is shown in FIG. 1. Line 1 is a feed line for bitumen into the first static mixer 2. A feed line 3 is provided through line 3 and line 1 and into the first static mixer 2. The outlet of the first static mixer is coterminous with the inlet 4 of the second static mixer 5. A line 6 for water quench is provided to the inlet 4 via line 6. An emulsion product outlet line 7 from the second static mixer via line 7 passes to storage at 8. Both of the static mixers were Kenic mixers, the first one of length 4.5 cm (6 elements) and diameter ¼" (0.63 cm) and the second one of length 140 cm (18 elements) and diameter ½" (1.27 cm).

EXAMPLES 1 TO 4

Employing the apparatus just described, 4 cationic bitumen emulsions were made as follows:

The bitumen at 130° to 170° C. pumped into static mixer 2. Water and cationic surfactant (Dinoram 5) were introduced through line 3 under pressure into mixer 2. Conditions in that mixer were: temperature 110° to 130° C. and pressure 10 to 30 bars. The product from mixer 2 was fed to mixer 5 and quench/dilution water added via line 6. Conditions in the second mixer were such that the product emerged at atmospheric pressure and at approximately 80° C. to 90° C.

In Examples 3 and 4 the bitumen starting material was fluxed with approximately 15% of a known bitumen fluxant oil.

The following Table details characteristics of the starting bitumen material and of the final bitumen emulsions. A comparison is made with a current commercially available cationic bitumen emulsion.

|  | EXAMPLE | | | | KNOWN PRODUCT |
|---|---|---|---|---|---|
|  | 1 | 2 | 3 | 4 |  |
| STARTING MATERIAL | | | | | |
| Bitume | 180/220 | 180/220 | 180/220 SB/Modified | 100/40 | 180/220 |
| Ring & Ball °C. | 38.6 | 38.6 | 56.7 | 87.6 | 38.6 |
| Penetration | 197 | 197 | 238 | 60.5 | 197 |
| Visc cSt (140° C.) | 200 | 200 | 2000 | 6500 | 200 |
| Emulsifier (kg/t) | 1.5 | 5.0 | 3.0 | 3.0 | — |
| EMULSION PRODUCT | | | | | |
| % Bitumen | 65 | 60 | 65 | 62 | 65 |
| pH | 3.5 | 6.0 | 6.5 | 5.6 | 2.7 |
| Residue % 160μ sieve | 0.02 | 0.03 | 0.58 | 0.03 | 0.18 |
| Mean particle | 4.6 | 2.6 | 5.0 | 4.8 | 8.2 |

-continued

| | EXAMPLE | | | | |
|---|---|---|---|---|---|
| | 1 | 2 | 3 | 4 | KNOWN PRODUCT |
| diameter ($\mu$) | | | | | |

What is claimed is:

1. A process for the preparation of a bitumen emulsion comprising sequentially;
   (a) feeding the bitumen into a first static mixer at a temperature in the range of 70°–250° C.;
   (b) introducing water under pressure into the first static mixer, the pressure being sufficient to prevent substantial vaporization of the water;
   (c) introducing a surfactant or emulsifier into the first static mixer;
   (d) mixing the bitumen, water and surfactant or emulsifier in the first static mixer;
   (e) passing the resultant mixture from the first static mixer to a second static mixer in which the temperature is lower than that prevailing in the first static mixer and below the boiling point of water;
   (f) passing the mixture through the second static mixer; and
   (g) removing a bitumen emulsion product from the second static mixer without substantial loss of water.

2. A process as claimed in claim 1, wherein further water is introduced into the mixture in or passing into the second static mixer.

3. A process as claimed in claim 1, wherein further surfactant or emulsifier is introduced into the mixture in or passing into the second static mixer.

4. A process as claimed in claim 1, wherein the surfactant or emulsifier is introduced as an aqueous solution.

5. A process as claimed in claim 4, wherein the surfactant or emulsifier is introduced in the water fed to the or each static mixer.

6. A process as claimed in claim 1, wherein the temperature in the first static mixer is in the range 110° to 130° C.

7. A process as claimed in claim 1, wherein the pressure in the first static mixer is in the range 2 to 80 bar.

8. A process as claimed in claim 1, wherein the mixture passing through the second static mixer is subject to a pressure drop and cooling, whereby the product emerges at substantially atmospheric pressure and below 100° C.

* * * * *